United States Patent Office 3,531,209
Patented Sept. 29, 1970

3,531,209
DIGITAL PRINTOUT SPECTROPHOTOMETER
Vivian Roy Williamson and Kenneth John Riggs, Braintree, England, assignors to Evans Electroselenium Limited, Braintree, Essex, England, a British company
Filed Sept. 11, 1967, Ser. No. 666,773
Claims priority, application Great Britain, Sept. 9, 1966, 40,329/66
Int. Cl. G01j 3/46
U.S. Cl. 356—180        6 Claims

ABSTRACT OF THE DISCLOSURE

A continuously cycling automatic printout spectrophotometer in which a liquid sample is drawn into a cuvette, a beam of light is projected through the sample on to a photoelectric element, output of the photoelectric element is electronically processed to produce an analogue voltage corresponding to a chemical characteristic of the sample, the analogue voltage is converted to a digital voltage, the result is printed out, and the sample is ejected from the cuvette in preparation for the succeeding cycle of sampling and measurement.

---

This invention relates generally to colorimeters, and more particularly to a digital printout spectrophotometer which automatically carries out colorimetric measurements on samples of a liquid at predetermined intervals and prints the results in digital form. Such apparatus is useful for a number of purposes.

In carrying our colorimetric analyses it is known to project a controlled beam of light through a liquid sample to be tested on to a photoelectric element and to determine certain chemical characteristics of the sample by measuring the output of the photoelectric element.

In the operation of many continuous chemical processes it is necessary to maintain certain chemical characteristics of solutions used in the process substantially constant. Alternatively where the output is in the form of a solution, it is necessary to check the output solution to ensure that the desired chemical characteristics remain substantially constant. In either case regular analyses are required, and in the case of an automatic plant arrangements are desirable to enable these analyses to be carried out automatically. In order that adequate human supervision may be maintained it is also desirable that the apparatus for automatic analysis should issue "reports" in a form which can readily be read by a human supervisor. The principal object of the invention is to provide such apparatus.

The invention consists of a digital printout spectrophotometer comprising means to project a beam of light through a sample to be measured, a photoelectric element to receive the projected light from the sample, electronic circuitry to convert the light transmission characteristic of the sample to an analogue voltage corresponding to a chosen characteristic of the sample, means to convert the analogue voltage to a digital equivalent, and a printer to produce a digital printout of the result of the measurement.

To carry out measurements on liquid samples a cuvette may be provided having a first bulb through which the beam of light is projected and a second bulb higher up to contain surplus liquid, the liquid being drawn into the cuvette by a motor-operated syringe. There may be a changeover valve associated with the syringe and cuvette to cause the syringe to draw in air from the atmosphere in addition to the liquid sample, so that when the measured sample is expelled the surplus air is also expelled.

The means to convert the light transmission characteristic of the sample may comprise means to generate a square wave voltage, a chopper controlled by the square wave voltage to chop the output of the photoelectric element, a differentiator to differentiate the chopped output voltage, means to produce direct voltage pulses corresponding in width to the height of the differentiated voltage pulses, and an integrator to integrate the direct voltage pulses to produce a steady direct analogue voltage.

A cam timer may be provided to control the repetitive automatic operation of the spectrophotometer.

In order to promote a full understanding of the invention one embodiment thereof will be described, by way of example, with reference to the accompanying drawings, in which—

Figure 1:
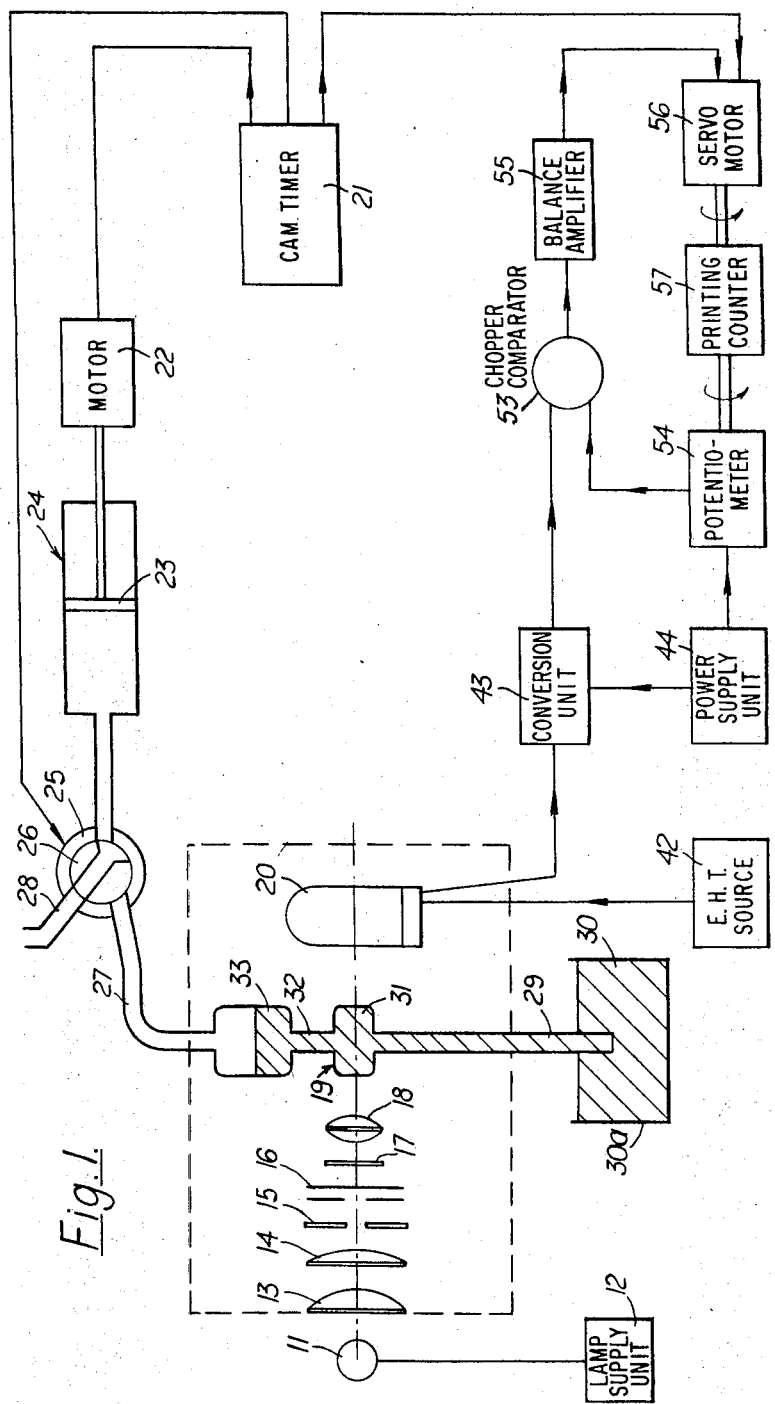
FIG. 1 is a diagram of the apparatus, partly in block schematic form.

Referring initially to FIG. 1, the apparatus according to the invention comprises a lamp 11 which is maintained at constant brilliance by being energized from a stabilized lamp supply unit 12. The light from the lamp 11 passes through a pair of condensing lenses 13 and 14 and through an iris diaphragm 15 by which the actual amount of light passing to the measuring portion of the apparatus may be controlled. From the iris diaphragm the beam of light passes through a spectral wedge 16 by which its colour is standardized, through a heat filter 17, a lens 18, a cuvette 19 in which the sample is contained and thence to a photomultiplier tube 20.

The cuvette 19 and its mode of operation provide a particular feature of the invention and it will now be described in conjunction with its companion elements. A motor-driven cam timer 21 controls the operation of the apparatus and determines the frequency of sampling and measurement. It may be of a type which is commercially available and consists of a drum built up of a number of cam discs, each cam disc being arranged to open and close a contact at predetermined points in the rotation of the cam disc, the drum making one complete revolution for each complete cycle of the apparatus. One of the contacts controls a motor 22 which, through a further cam arrangement or rack and pinion gear, operates the piston 23 of a syringe 24. The syringe 24 is connected by a tube to a changeover valve 25 containing a valve member 26, the valve 25 being connected by one tube 7 to the cuvette 19 and being vented to atmosphere by another tube 28. At the beginning of a cycle, and assuming that the cuvette 19 is empty, the motor 22 is started. The valve member 26 of the changeover valve 25 is not initially in the position shown in FIG. 1 but in its other position in which the valve member 26 connects the syringe 24 to the tube 27 leading from the cuvette 19. The cuvette 19 comprises a narrow tube 29, the open end of which dips into the sample 30 contained in a sample container 30a. Above the tube 29 is a bulb 31 which holds the portion of the liquid upon which the measurement is carried out. The bulb 31 is connected by another narrow tube 32 to a further bulb 33 which is connected to the tube 27. The motor 22 is arranged to run for a length of time adequate to draw in an amount of liquid sufficient to fill the bulb 31 and partly to fill the bulb 33. By this means it is ensured that any small amount of a previously measured sample clinging to the walls of the cuvette is washed upwardly into the bulb 33 so that the sample actually measured is truly representative of the liquid 30. When sufficient liquid has been drawn into the cuvette the valve 25 is changed over to the position shown in FIG. 1 by a motor or an electromagnetic actuator, often referred to as a solenoid (not shown) controlled by the cam timer 21 and thereafter the syringe 24 draws in a quantity of air from the atmosphere. While the syringe draws air from the atmosphere the tube 27 is sealed so that the liquid in the cuvette 19 is "locked in."

After the measurement (which will be described later) has been carried out the direction of movement of the syringe piston 23 is reversed and the member 26 of the changeover valve 25 is changed back to its initial position. The reversal of movement of the syringe piston may be accomplished by using a mechanical reciprocating motion between the motor and the piston rod of the piston 23 or by arranging for the cam timer to reverse the rotation of the motor 22. The syringe 24 now expels air through the tube 27 and into the cuvette. Since it drew in extra air from the atmosphere it not only empties the cuvette but also blows air through it, which issues as bubbles into the sample. This ensures that the inside of the cuvette is well "washed" by the air stream. This ends the cycle and the next cycle is begun by again reversing the direction of movement of the syringe piston 23 to draw in a new sample.

It is, of course, to be understood that the sample 30 is being continuously changed. This may be arranged by continuously supplying new liquid to the container 30a and allowing the old liquid to drain away at the same rate or making the container 30a a part of a channel through which the liquid to be measured flows.

Figure 2:
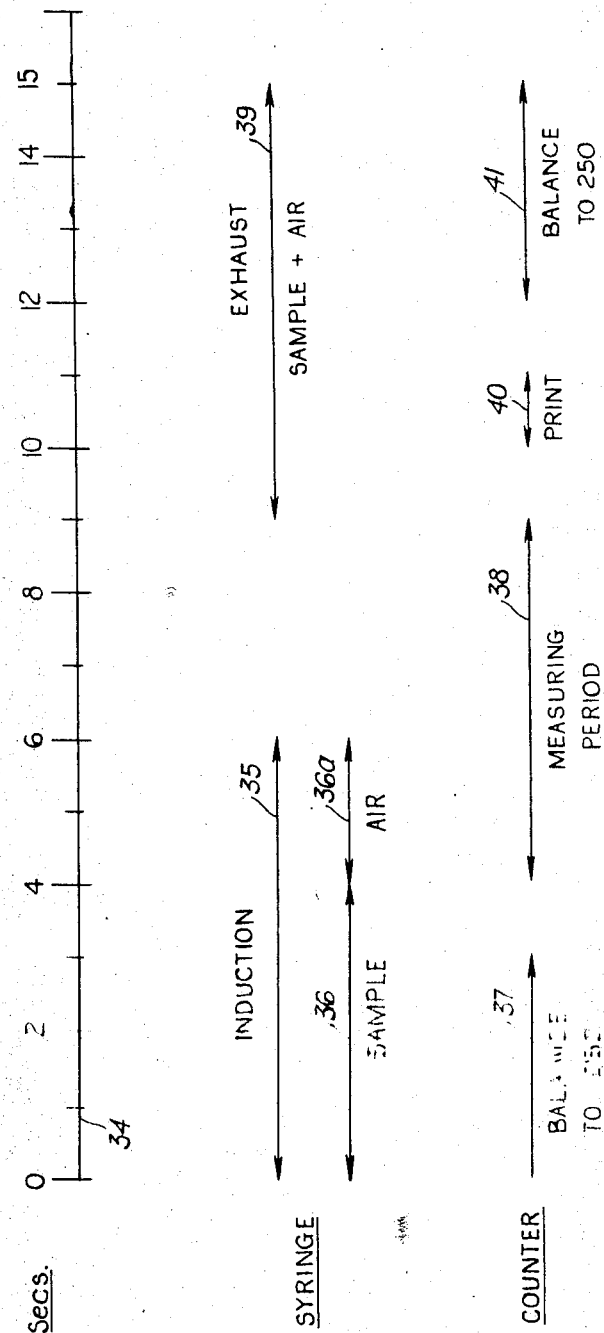
FIG. 2 is a timing diagram of the operation of the apparatus.

FIG. 2 shows a timing diagram which is typical of the operation of the apparatus for one particular purpose. A scale 34 is marked from 0 to 15 and represents seconds of time, this being the time for one complete cycle of measurement. The operation of the syringe is shown below the scale 34 and is represented partly by a double headed arrow 35, indicating that the full induction stroke of the syringe takes 6 seconds. This period is divided into two parts, the first, represented by the double headed arrow 36, being the part in which liquid sample is being drawn into the cuvette 19, this taking 4 seconds, the second part being represented by the double headed arrow 36a, in which additional air is being drawn from the atmosphere for a period of two seconds.

Below the arrows relating to the syringe is a third line of arrows relating to the actual measurement and printing, preceded by the word "counter." The first arrow, 37 occupies the first 3 seconds of the period, while the sample is being induced and is labelled "balance to 250." This process will be described in detail later. There is then a pause of one second while the induction of the sample is being completed, after which the measuring period begins, the time allowed for measurement being 5 seconds. The actual process of measurement will be described later. Immediately at the end of the measuring period—that is, at the end of 9 seconds—the exhaust stroke of the syringe piston commences and during the remaining 6 seconds of the cycle the syringe is exhausted. There is a one-second pause at the end of the measuring period during which the print mechanism is being set and the printout then takes place. One second is allowed for this, and a further one-second pause is provided, after which the balance operation styled "balance to 250" commences. This runs into the succeeding measuring cycle, where the arrow 41 continues as the arrow 37 of the next cycle.

Reverting to FIG. 1, the photomultiplier tube 20 is powered by a stabilized E.H.T. source 42. Its output current is passed to a "transmission to density" conversion unit 43 which derives its power from a stabilized power supply unit 44 which also supplies other units of the apparatus.

Figure 3:
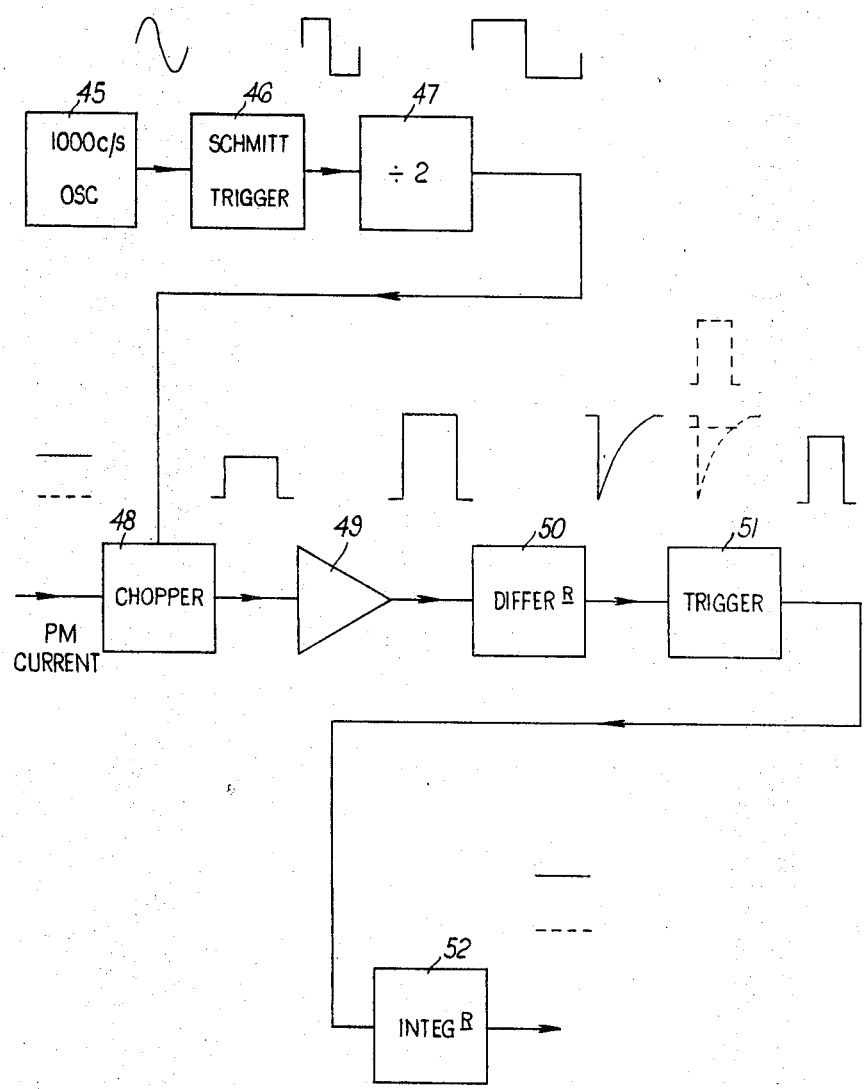
FIG. 3 is a block schematic diagram of a part of the electronic equipment.

It should be noted at this stage that the measurements are made in arbitrary units, not absolute units. For example, if the liquid in the sample container is a solution of a certain substance in tap water, then the transmission of light through a sample of clear tap water is taken to represent 100 percent transmission. The percentage light transmission decreases as the amount of the particular substance in solution increases. The output current of the photomultiplier is related in a linear manner to the light transmission through the solution. The actual amount of the substance in solution controls its optical density and here again there is a linear relationship. On the other hand, the relationship between the light transmission and the optical density is given by the expression $$O.D. = \log \frac{100}{T}$$

where O.D. is the optical density and T is the light transmission. The purpose of the unit 43 is to provide a voltage which varies substantially linearly with optical density and it will now be described with reference to FIG. 3. It comprises a stable oscillator 45 which produces a reasonably pure sine wave output at a convenient frequency, in the present instance, 1000 c./s. The sine wave oscillation is applied to a Schmitt trigger circuit 46 which produces a square wave output of the same frequency and this is divided by two in the unit 47 to produce a square wave output of 500 c./s. The object of dividing by two is to ensure that the vertical edge of each half-cycle of the wave produced by the unit 47 is controlled by the leading edge of one cycle of the Schmitt trigger output, so that the two halves of the output wave from the unit 47 are of identical length. This is important, as will appear later.

The current output of the photomultiplier 20 contains a certain amount of noise and it is applied to a capacitor (not shown) to smooth it. It is then applied to a chopper 48 which produces a square wave having a length equal to that of the square wave from the unit 47 and an amplitude equal to the amplitude of the direct current from the photomultiplier. The output from the chopper is passed to an amplifier 49 and the amplifier output is in turn passed to a differentiating unit 50 having a small time constant, one half of the spiked wave from the differentiating unit being shown. The differentiated output dies away exponentially and it is passed to a trigger circuit 51 whose action is similar to that of a Schmitt trigger circuit except that the characteristic "backlash" of the Schmitt trigger is substantially absent. This circuit produces an output whenever the voltage of the differentiated spike rises above a a certain level and cuts off when the exponential decay curve falls below this level. Hence it produces a series of unidirectional rectangular pulses whose amplitude is constant but whose length varies with the height of the differentiated spikes. It is because only one half of each wave is used by the trigger circuit 52 that it is important that the two halves of the wave produced by the unit 47 should be of exactly equal length.

The output of the trigger circuit 51 is passed to an integrating circuit 52 which produces a steady direct voltage output proportional to the length of the direct current pulses from the trigger circuit 51. This voltage has a linear relationship to the optical density of the liquid sample and is an analogue voltage thereof.

Reverting to FIG. 1, the direct voltage output from the conversion unit 43 is passed to a chopper comparator 53, which is also fed with the output of a precision potentiometer 54 receiving an input voltage from the stabilized supply unit 44. The two voltages applied to the chopper comparator 53 are chopped and compared, so that the output consists of a series of positive or negative pulses, according to the direction of unbalance. The servo system used for setting the printing counter may, of course, be of A.C. or D.C. type, but in the present case it is of the A.C. type, and a balance amplifier 55 supplies an alternating voltage which varies in magnitude with the amplitude of the D.C. input pulses and in phase with the polarity of the input pulses. If the D.C. input pulses are of one polarity then the A.C. output is phase-reversed with respect to the output if the input pulses are of opposite polarity. An A.C. servo motor 56 is of the usual two-phase type in which the field is supplied with alternating current which is phase-displaced by 90° with respect to the rotor current and its direction of rotation depends on whether the rotor current leads or lags with respect to the field current. The servo motor 56 is switched on and off at the appropriate times by the cam timer 21, and its shaft is mechanically coupled to a printing counter 57 and to the precision potentiometer 54. In operation, if there is a difference in the output voltages of the conversion unit 43 and the precision potentiometer 53 the balance amplifier 55 produces an alternating voltage output which causes the servo motor 56 to run in a direction such as to reduce the difference to zero. In doing so it sets the printing counter to the digits corresponding to the zero position. The cam timer allows a certain time for the servo motor to find the zero position and then energizes an electromagnetic actuator (not shown) in the printing counter which causes the digits set up in the counter corresponding to the output voltage of the conversion unit 43 to be printed. The printer also prints a consecutive number corresponding to the number of the measurement made from the start of a given series.

To ensure that the movement required from the precision potentiometer and the printing counter is a minimum the servo motor is caused to drive these units to a mid position after the printing of each result, while preparations are being made for the next measurement. This is the operation covered by the arrows 41 and 37 in FIG. 2 and marked "balance to 250."

Photomultiplier cells are subject to fatique after being in operation for a period and certain other factors may also lead to drift in the readings. The original conditions may be restored by placing a sample having a 100% transmission characteristic in the cuvette and then adjusting the stabilized output of the supply unit 42. This may be carried out automatically at selected intervals of time, the printer being inhibited, so that it does not print the 100% transmission reading.

It will be understood that modifications may be made to the embodiment described and shown in the drawings within the scope of the invention as defined in the appended claims.

We claim:

1. A digital printout spectrophotometer comprising means for automatically taking, at predetermined intervals, samples of a liquid to be continuously analyzed, means for projecting a beam of light through the said samples of liquid to measure their optical density, a photoelectric element to receive the projected light from each sample and to produce a voltage which is related to the optical density of each liquid sample by a logarithmic law, an electronic chopper connected electrically to the photoelectric element whereby the output voltage from the photoelectric element is chopped to form a rectangular wave, an amplifier connected electrically to the chopper whereby the rectangular wave is amplified, a differentiating circuit connected electrically to the amplifier, a trigger circuit connected electrically to the differentiating circuit whereby the differentiated voltage therefrom is applied to the trigger circuit to provide an electrical output whenever the magnitude of the differentiated voltage is above a predetermined level, an integrating circuit connected electrically to the trigger circuit whereby the electrical output of the trigger circuit is integrated and printing means to produce from the electrical output of the integrating circuit a digital printout of the result of the measurement of each liquid sample 2. A spectrophotometer as claimed in claim 1 comprising a cuvette having a first bulb through which the beam of light is projected and a second bulb higher up to contain surplus liquid, and a motor-operated syringe to draw sample liquid into the cuvette.

3. A spectrophotometer as claimed in claim 2 comprising a changeover valve associated with the syringe and cuvette to cause the syringe, when operated, to draw air from the atmosphere in addition to the liquid sample, so that when the measured sample is expelled the air is also expelled.

4. A spectrophotometer as claimed in claim 1 comprising a cam timer to control the repetitive automatic operation of the spectrophotometer.

5. A spectrophotometer as claimed in claim 1, having a stable sine wave oscillator, means to convert the oscillator output to rectangular waves, and a circuit to divide the rectangular wave frequency by two, the output voltage of the circuit being used to control the chopper.

6. A digital printout spectrophotometer comprising, in combination:
means for automatically taking, at predetermined intervals, samples of a liquid to be analyzed continuously;
means for projecting a beam of light through the samples;
a photoelectric element for receiving the beam of light and having an output linearly related to the light transmission through the samples;
conversion means receiving the output of said photoelectric element for producing an output linearly related to the optical density of the samples, said conversion means including means for producing a continuous train of pulses, the frequency of which is fixed and in which the duration of the pulses are equal with the amplitudes of the pulses being linearly related to the output of said photoelectric element, means for differentiating said train of pulses, and trigger means connected to the output of said differentiating means for producing a continuous train of pulses of fixed amplitude and of time duration dependent upon exponential decay time of the differential pulses, and means for integrating the pulse output train of said trigger means to produce an analog output linearly related to the optical densities of said samples;
reference signal means; and
means for producing a readout dependent upon the difference between the ouputs of said means for integrating and said reference signal means.

References Cited

UNITED STATES PATENTS

| | | | |
|---|---|---|---|
| 2,972,925 | 2/1961 | Armbrecht et al. | 356—203 |
| 3,142,719 | 7/1964 | Farr | 356—246 |
| 3,263,554 | 8/1966 | Pickels | 356—246 |
| 3,364,811 | 1/1968 | Baruch et al. | 250—218 |
| 3,377,467 | 4/1968 | Staunton et al. | 356—74 |

RONALD L. WIBERT, Primary Examiner

V. P. McGRAW, Assistant Examiner

U.S. Cl. X.R.

250—214, 218; 356—246